United States Patent

[11] 3,630,601

[72] Inventor Kurt Lehovec
 11 Woodlawn Drive, Williamstown, Mass. 01267
[21] Appl. No. 801,396
[22] Filed Feb. 24, 1969
[45] Patented Dec. 28, 1971

[54] PHOTOELECTRIC REGISTRATION OF BALL ROTATION AS TEACHING AID FOR BALL GAMES
 8 Claims, 8 Drawing Figs.
[52] U.S. Cl. .................................................. 356/256, 73/432
[51] Int. Cl. ..................................................... G02b 27/32, G01f 15/14
[50] Field of Search ........................................ 340/220, 420; 250/203; 73/432; 356/256, 27; 324/28, 75, 70 C

[56] References Cited
UNITED STATES PATENTS

| | | | |
|---|---|---|---|
| 3,274,512 | 9/1966 | Okaya .......................... | 331/94.5 |
| 3,301,071 | 1/1967 | Shalloway .................... | 324/70 C |
| 1,747,664 | 2/1930 | Droitcomb ................... | 250/203 X |
| 3,486,032 | 12/1969 | Cufflin ......................... | 250/224 |
| 3,422,686 | 1/1969 | Unruh ........................... | 74/5.6 |

OTHER REFERENCES
Digital Tachometer

*Primary Examiner*—Ronald L. Wibert
*Assistant Examiner*—Conrad Clark

ABSTRACT: The ball is provided with a surface pattern of regions of different optical properties. Light reflected from the moving ball is modulated by the rotation of these regions, transformed into a time variable electrical signal in a photocell, and recorded or displayed.

PATENTED DEC 28 1971

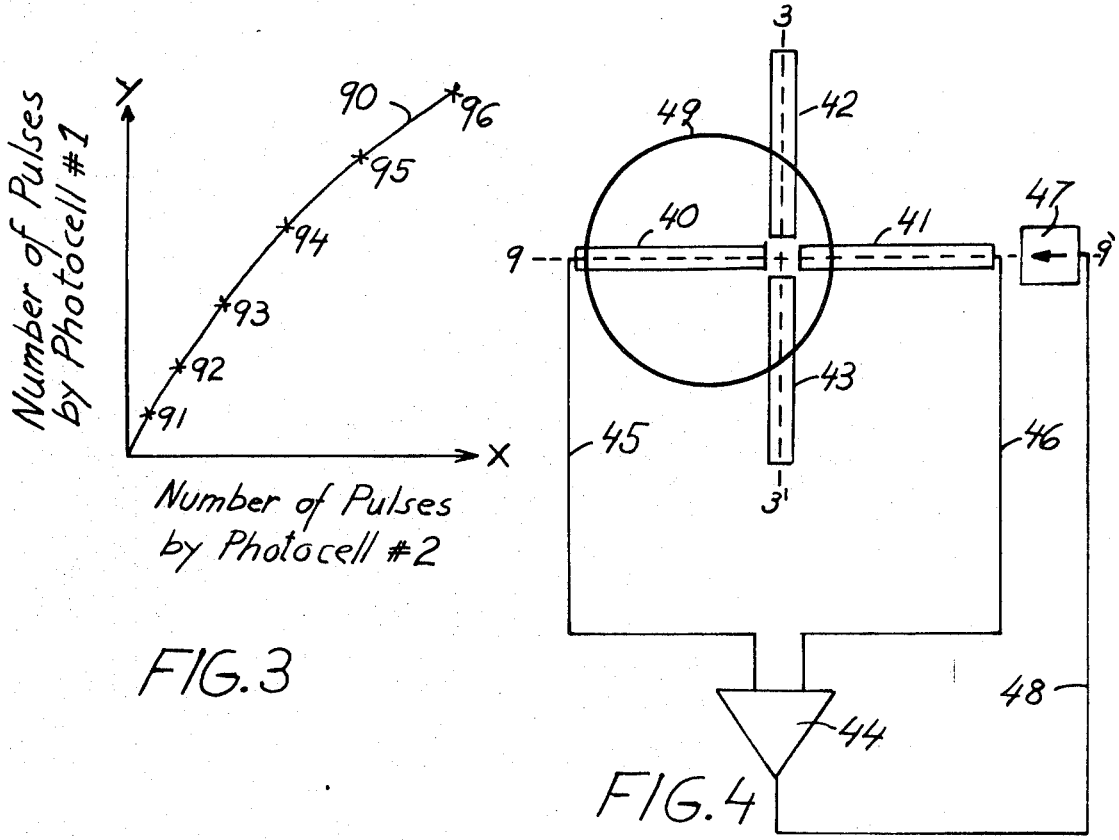
FIG.3
FIG.4
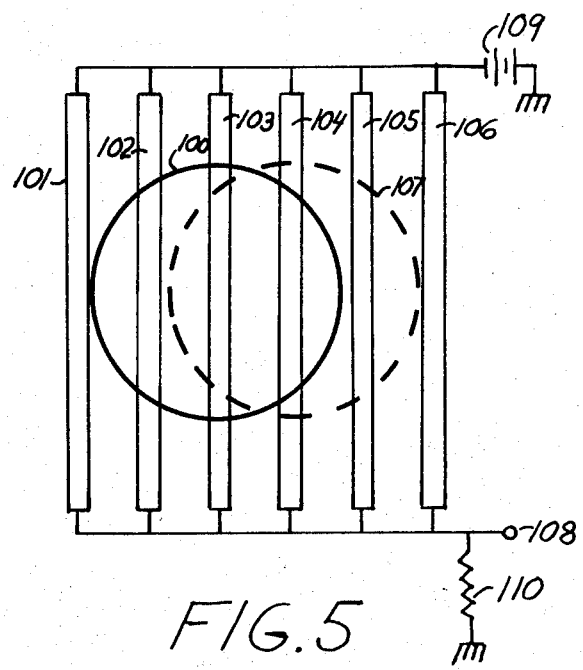
FIG.5
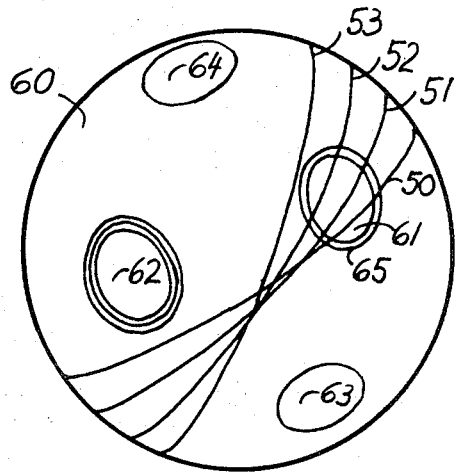
FIG.6

PHOTOELECTRIC REGISTRATION OF BALL ROTATION AS TEACHING AID FOR BALL GAMES

BACKGROUND OF INVENTION

The invention concerns a means for analysis of the rotational motion of a ball as a teaching aid for ball games.

Ball games, such as bowling, tennis, baseball and golf are recreational occupations enjoyed by millions of persons. Considerable money and time are invested in mastering the intricacies of these games. In addition to the direction and speed of the ball delivered by the player, there is another elusive quality of the ball, known as a "live" ball in bowling, a "cut" or "sliced" ball in tennis, a "curved" ball in baseball, etc., which refers to the spin imposed on the ball by the player. An objective registration by instruments of this quality considerably aids in the improvement of the game, by checking the consistency of spin in repeated deliveries and by enabling the comparison of the chart for the spin of the ball of the player with that for the spin of recognized experts of the game.

An object of this invention is a means for measurement and registration of the rotational motion of a ball.

Another object of this invention is a ball provided with a surface pattern for registration of its rotational motion.

BRIEF DESCRIPTION OF THE INVENTION

The device for registration of ball rotation according to this invention utilizes a ball having a surface pattern of regions of different optical properties. A photocell is arranged in such a manner that light coming from the ball and striking the photocell causes a time variable electrical signal whose intensity depends on the rotation of the surface pattern of the ball as viewed by the photocell. By using a multiphotocell arrangement, the ball rotation can be resolved into its components of rotation around two perpendicular axes whose directions are fixed in space, and this suffices to describe the most general mode of rotation of the ball.

EXPLANATION OF DRAWINGS

FIG. 3 shows a representation of the photocell outputs for the arrangement of FIG. 2.

FIG. 4 shows an arrangement for keeping the ball image centered with respect to the photocells.

FIG. 5 shows another arrangement for eliminating the effect of ball image motion versus the photocells.

FIG. 6 shows a ball according to this invention and the trace of points on the ball which come successively into the position for reflecting light into a photocell as the ball rotates.

PREFERRED EMBODIMENTS

For an understanding of the preferred embodiments for analysis of ball rotation, a brief comment on the characterization of motion of a sphere is helpful.

Figure 1:
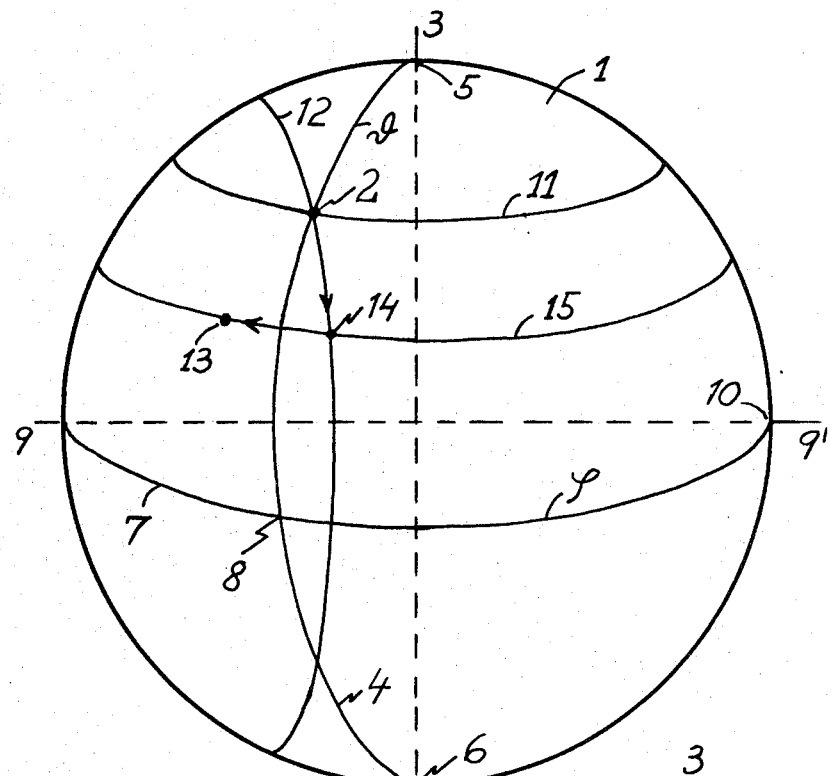
FIG. 1 is a sketch of a sphere for characterization of any general rotational motion by rotation around two perpendicular axes.

FIG. 1 shows a sphere 1 with a point 2 on its surface. A vertical polar axis 3—3' is shown, and the circle 4 on the surface of the sphere is sketched which connects the poles 5, 6, of the axis 3—3' with the point 2. The arc between the points 2 and 5 of this circle represents the polar coordinate $\theta$ of the point 2. The line 7 is the "equator" of the sphere and the intersection of circles 4 and 7 is the point 8. The horizontal axis 9—9' is considered to be fixed in space and is used as reference for the longitudinal coordinate $\phi$ of the point 2 as measured by the arc between the points 8 and 10 along the equator 7. Note that the polar coordinate $\theta$ is not changed by rotation of the sphere around the polar axis 3—3'. The point 2 would merely move along the parallel circle 11 of constant latitude $\theta$. On the other hand, rotation of the sphere around the axis 9—9' moves the point 2 along the circle 12, whereby both coordinates $\theta$ and $\phi$ are changed.

The motion of the point 2 into a different position, such as 13, can be accomplished as follows: First, a rotation around the axis 9—9' into position 14 on the circle 12. The point 14 has the same latitude as 13 since both lie on the circle 15 of equal latitude. Secondly, a rotation around the axis 3—3' which moves the point 14 into the position 13 along the circle 15. The two motions have been indicated by arrows. Thus, any rotational motion of a sphere which moves a point 2 into a different position 13 can be characterized by rotations around two axes through the center of the sphere, whose directions are fixed in space and which are perpendicular to each other.

The rotation around these two axes can be measured as follows: Consider the ball having a surface pattern of regions of different brightness such as a number of equally spaced bright dots on a dull background. Dot positions in such a regular arrangement are easily derived from polyhedrons with regular faces: e.g., the corners of a tetrahedron provide a four-dot-pattern; the corners of an octahedron provide a six-dot-pattern and its face centers an eight-dot-pattern; the face centers of a dodecahedron provide a 12-dot-pattern and its corners a 20-dot pattern.

Figure 2:
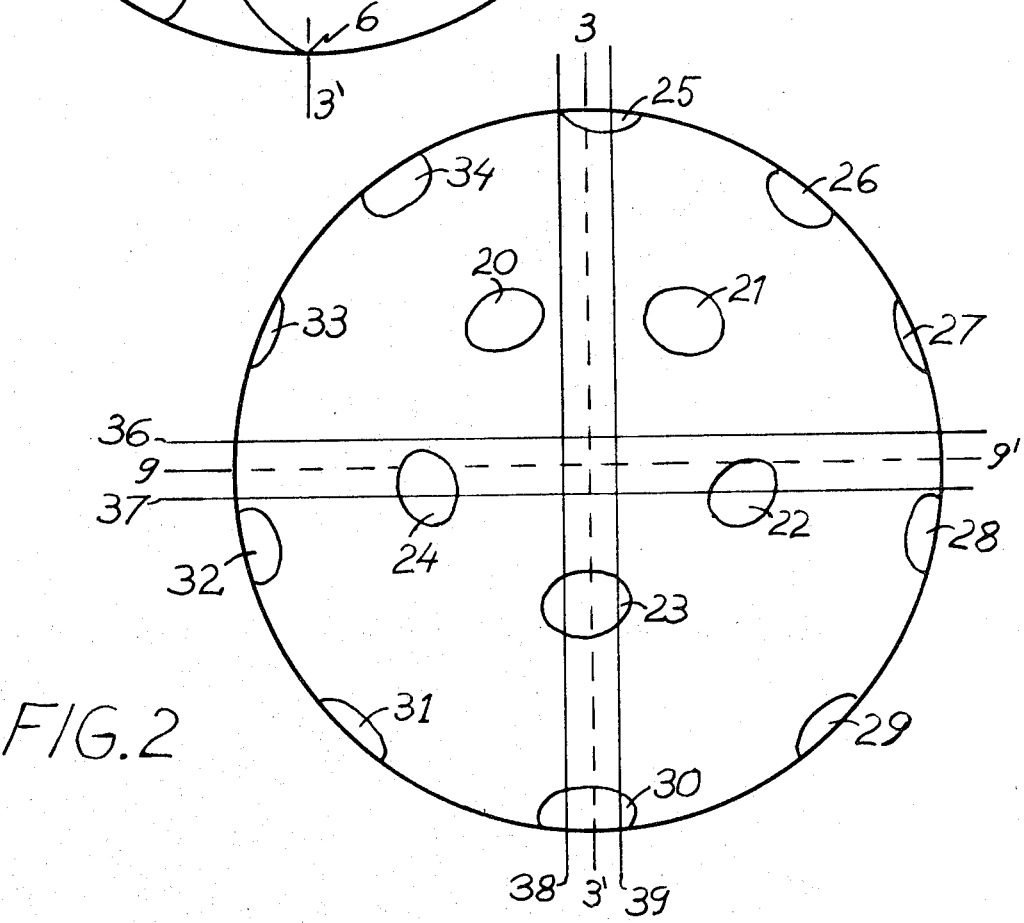
FIG. 2 shows the optical image of a ball with a surface pattern according to this invention and the preferred arrangement of photocells for analysis of the ball rotation.

An optical image of a ball having dots arranged in the corners of a dodecahedron is shown in FIG. 2. The 15 visible dots of the ball are numbered 20–34. Consider a photocell exposed only to the thin strip-shaped section between 36 and 37, perhaps by covering up the section of the image outside the lines 36 and 37, or else by using a photocell of strip-shaped sensitive area. If the ball rotates around horizontal axis such as 9—9', all the dots on the ball will come into the view point of the photocell once during each full rotation and then disappear with the possible exception of at the most two dots which might happen to be located at the poles of the axis 9—9'. Thus, with each full rotation around the axis 9—9', the photocell will provide a number of electric pulses essentially equal to the number of bright dots on the ball. The number of pulses generated by the photocell can be counted by an electrical counter, taking into account pulses of extra duration or extra length which might arise from two dots more or less simultaneously crossing the view field of the photocell between 36 and 37.

On the other hand, a rotation around the vertical axis 3—3' will not cause a significant number of pulses in the photocell exposed to the strip between 36 and 37 since most of the dots do not cross the horizontal area by rotation around the vertical axis.

In order to measure the rotation around the vertical axis, the photocell should be positioned to view the vertical strip between the lines 38 and 39 in FIG. 2.

Any general rotation can be composed of two rotations around the axes 3—3' and 9—9' as was shown on hand of FIG. 1. A general rotation can thus be registered by means of two photocells, exposed simultaneously each to one strip, the strips being perpendicular to each other. The result can be expressed in various manners: FIG. 3 shows a representation of the rotational ball motion on an $x$–$y$ chart. Along the ordinate axis $y$ there is plotted the number of counts registered by the photocell number 1, which is exposed to the strip between the lines 36 and 37 in FIG. 2. Along the abscissa axis $x$, we plotted the number of counts by the photocell number 2, which is exposed to the strip between the lines 38 and 39 in FIG. 2. The number of counts are added electronically for each photocell and fed into the $x$ and $y$ inputs of an $x$–$y$ recorder generating the trace 90. In regular time intervals, e.g., each 0.2 seconds, a marker signal pulse is impressed on the trace, resulting in the points marked 91–96. If the trace shown in FIG. 3 were that of a bowling ball, and the axis 9—9' of FIG. 2 were horizontal and essentially perpendicular to the trajectory of the ball on the alley, a straight ball, i.e., a ball without spin, would have a trace along the ordinate y. The x-deflection in FIG. 3 thus measures the spin. The fact that the time markers 91 and 92 lie closer together than subsequent markers 94 and 95, indicates an initial skidding motion before the ball "grips" the alley.

Other representations of the photocell output can be chosen. E.g., the two time tracks of the outputs of the two photocells can be displayed on charts or else registered on magnetic tape for storage and later display. Still another representation might consist in printing out total count numbers for each photocell at various time intervals. These numbers can be evaluated mathematically in a computer to obtain any desired characterization of the ball motion. For instance, the ball rotation could be described in terms of a rotation at various speeds around a single axis, the axis shifting its direction slowly with time.

In the arrangement of registration shown in FIG. 2, it is important that the ball image is centered with respect to the crossing points of the strips 36—37 and 38—39. This can be achieved by a tracking mechanism, for which FIG. 4 shows an example. 40–43 are four photocells. 40 and 41 measure the light pulse input into a horizontal strip such as between the lines 36 and 37 of FIG. 2 and 42 and 43 achieves the same for the vertical strip such as between the lines 38 and 39 in FIG. 2. If the ball is centered with respect to the vertical centerline through 42 and 43, the photocells 40 and 41 will display the same signal intensity when averaged over time. The time-averaged outputs of these photocells 40 and 41 are fed into a differential amplifier 44 through the wires 45 and 46, and its output is fed into a servomotor 47 through wire 48. The servomotor moves the four-photocell arrangement along the horizontal axis 9—9' to the left or right depending on the polarity of the signal from the differential amplifier 44. If the ball image is off center as shown by the circle 49, the photocell 40 will receive a larger time average signal than 41 and the output of the differential amplifier 44 causes the servomotor 47 to drive the four-photocell arrangement to the left as indicated by the arrow until the center position of the ball image coincides with that of the four photocells.

It is obvious that a similar arrangement can be provided for keeping the ball image centered with respect to the axis 9—9' by another differential amplifier hooked up to the photocells 42 and 43 and feeding a servomotor which displaces the four-photocell arrangement in the vertical 3—3' direction.

A possible arrangement which does not require mechanical motion for 3—of ball image with respect to photocell location is shown in FIG. 5. Several photocells 101–106 of vertical strip shape are positioned in the plane of the ball image at equal lateral intervals. The image of the ball 100 encompasses the photocells 102, 103 and 104, but does not fall on the photocells 101, 105 and 106. If the ball image moves into the position 107, the photocell 102 does not register any more signal pulses from the surface regions of the ball, but the photocell 105 now registers such signal pulses, so that the number of output pulses at terminal 108 is not affected since all photocells are connected in a parallel configuration. 109 is a power source and 110 a load resistance. The output 108 can be fed into a pulse counter or connected to a recorder and plotted vs. time.

The same principle can be applied to vertical motion of the ball image by using a number of vertically equally spaced photocells of the horizontal strip type.

Instead of using a number of individual photocells connected electrically in a parallel arrangement, such as 101 and 106 in FIG. 5, one may use a single photocell of sensitive area large compared to the ball image and cover its surface with a diaphragm containing a number of equally spaced striplike openings corresponding to the areas 101 to 106 of FIG. 5.

Analysis of ball rotation can also be achieved by using the light signal received by a single photocell from a single point of the ball surface. This condition is realized when using the ball as reflector of light beam projected onto the photocell. Since the curved surface of the ball acts as a dispersive mirror, only a very small surface area, i.e., a "point" on the surface, will contribute to the light reaching the photocell at a given time. No lens system need be used in principle to form an image of the ball on the photocell, although an optical arrangement can be helpful to increase signal intensity by increasing the "point"-area.

FIG. 6 shows a ball 60 having a dot pattern 61, 62, 63 and 64 of bright dot-shaped areas. The lines 50, 51, 52 and 53 are part of a spiral encircling the ball and represent positions on the ball surface which move successively into the point from which the photocell receives its signal as the ball travels along.

If the ball motion is a simple rotation around a single axis whose direction is fixed in space, the spiral 50–53 would degenerate into a single circle on the ball surface. The time pattern generated by the photocell would then be repetitive. However, when the cell motion is more complex so that it requires the rotations around two axes for adequate description, the curve 50 will not retract itself exactly, and a spiral pattern such as shown in FIG. 6 will arise. As a result, the dot 61 will be crossed along slightly different paths by the trajectories 50–52. For instance, the trajectory 50 crosses the dot 61 close to its circumference; the next trajectory 51 crosses the same dot near the center; the subsequent trajectory 52 crosses the dot near its periphery and the trajectory 53 does not cross the dot 61 at all. The photocell signal arising from the dot 61 during the trajectories 50–53 will thus consist of three pulses of different widths, as shown in FIG. 7.

Figure 7:
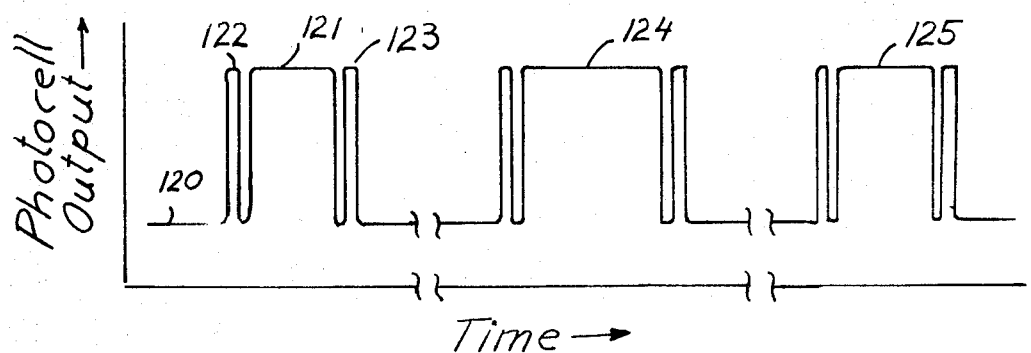
FIG. 7 is a recording of the photocell output for the case of FIG. 6.

FIG. 7 represents a recording of the photocell output vs. time. 120 is the background signal level of the ball outside the brightly reflecting dots 61–64 of FIG. 6. As the trajectory 50 of FIG. 6 crosses dot 61, the signal 121 arises. The satellite peaks 122 and 123 arise from the satellite ring 65 around dot 61 in FIG. 6 and serve to identify the dot from which the signal is received. The signal 124 arises from the trajectory 51 and the signal 125 from the trajectory 52.

The rotational mode of the ball can be reconstructed from the widths of the pulses resulting from dot 61, in conjunction with the pulses resulting from the other dots on the ball. The analysis of these pulses is simplified by using some means of identifying pulses belonging to the same dot. Such means include dots of different brightness or color; or else a rim structure code such as a number of narrow circles surrounding a dot, the number of circles differing for different dots. E.g., dot 62 has two such satellite circles while 61 has only one. The analysis just described employs preferably a rather small number of large dots which are distinct from each other in contrast to the method discussed on hand of FIGS. 2 and 3 which employs preferably a rather large number of small, identical dots.

Figure 8:
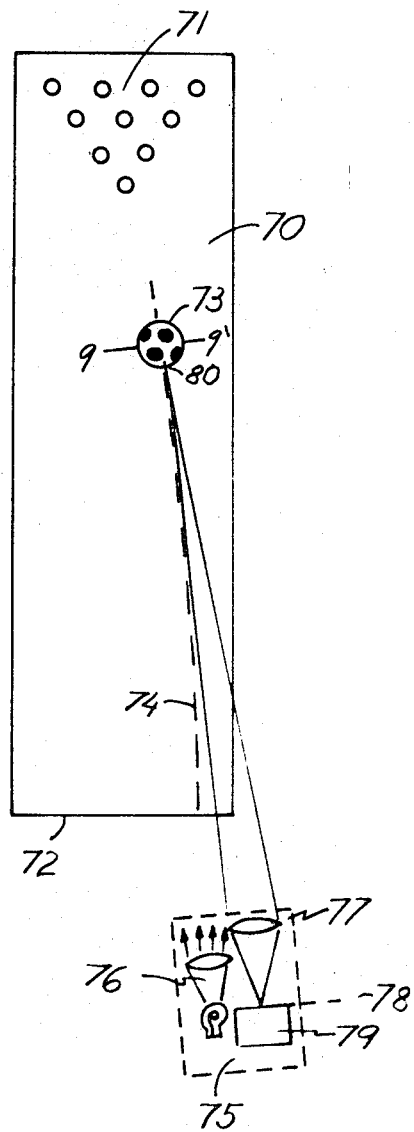
FIG. 8 shows an arrangement for registration of the motion of a bowling ball on an alley according to this invention.

FIG. 8 shows a complete arrangement for registration of ball motion according to this invention.

Seventy is a bowling alley with the pin positions marked by circles in the triangular area 71 at one end of the alley and the foul line 72 at the other end of the alley. 73 is a bowling ball with dot surface structures moving along the dashed trajectory 74 toward the pins. Its principal mode of motion is the rotation around the horizontal axis 9—9' through the center of the ball and nearly perpendicular to its trajectory 74. In front of the foul line, at the right-hand side of the alley, the registration equipment 75 is located, which encompasses the light projector 76 for illumination of the ball as it moves along the alley; the optical system 77 for producing an image of the ball 73 in the plane 78 where the photocell or photocells are located and the means 79 for photoelectric registration of the ball image as discussed previously.

The space taken by equipment 75 has been exaggerated for sake of clarity of representation with respect to the width of the alley. In practice, the projector 76 is preferably arranged above the optical receiver 77 so that the width of 75 need only be a few inches. Therefore, the equipment 75 can be easily placed at the side of the alley so that the approach of the bowler for ball delivery is not impeded.

The equipment 75 can be portable and may be shifted along the foul line to the other side of the alley if so desired in order to avoid interference with the approach chosen by the bowler. The equipment 75 can also be placed in the rear of the alley i.e., near the pin location 71.

In the case of ball rotation analysis by a striplike multiphotocell arrangement as discussed on hand of FIG. 2 and FIG. 3, only lateral centering of the image of the ball is necessary, since the bowling ball moves along the floor of the alley. In general, centering is minimized by viewing the ball in the direction of its trajectory 74. If the registration method discussed on hand of FIG. 6 is used, there is no absolute need for the lens system 77, although such system might enhance the photocell signal. The point on the ball surface which reflects the projected light into the photocell is designated by 80 in FIG. 8.

The projector may be chosen to emit an infrared or else an ultraviolet light beam in order to avoid distraction of the bowler. Or else, a projector of visible light may be switched on by a photoelectric arrangement similar to presently existing foul indicators only after the ball has been released by the bowler. In general, light projectors of suitable spectral distribution or intensity undulation can be used to distinguish the desired signal received by the photocell from the ball from background signal, by means of optical or electrical filter and tuning arrangements well known to those skilled in the art.

Surface patterns according to this invention need not necessarily contain dot-shaped regions; coordinate system such as meridians and latitude circles of a globe can also be used.

As there are obviously a large number of possible embodiments of my invention, it should be understood that this invention is not limited by the preferred embodiments presented, but encompasses all means for ball registration characterized by the following claims:

1. An apparatus for registration of the rotational component of an unrestricted rotational motion of a substantially spherical body around an axis through the center of said body, said axis of direction fixed in space, said apparatus comprising
   i. pattern of optically distinct regions on the surface of said body, said pattern consisting of identically shaped spots equally spaced across said surface,
   ii. means to illuminate said body,
   iii. means to project an image of said body on a photocell, using light reflected from said body,
   iv. said photocell exposed only to a portion of said image of said body, said portion being strip-shaped, and oriented parallel to said axis of direction fixed in space, and
   v. electrical means to count or otherwise record the responses of said photocell to the images of said regions as they move through said strip-shaped portion due to said rotational component of motion of said spherical body around said axis.

2. The apparatus of claim 1 including means to keep said image of said spherical body centered with respect to said strip-shaped exposed portion.

3. The apparatus of claim 1 whereby said strip-shaped portion is narrower than the spacing between said spots.

4. The apparatus of claim 1 whereby said optically distinct regions differ in color from the background surface of said sphere.

5. The apparatus of claim 1 whereby said optically distinct regions differ in reflectivity from the background surface of said sphere.

6. The apparatus of claim 1 including a second photocell exposed to the image of a second strip-shaped portion of said spherical body, said second strip-shaped portion orthogonal to said strip-shaped portion of claim 21, electrical means to count or otherwise record the responses of said second photocell to the images of said regions as they move through said second strip-shaped portion, whereby the most general rotation of said body is resolved and fully characterized by its rotational components around said fixed axis of claim 21, and around a second axis of direction fixed in space, said second axis perpendicular to said axis of claim 21 and oriented parallel to said second strip-shaped portion.

7. The apparatus of claim 6 including means to center said second striplike portion with respect to said spherical body.

8. The apparatus of claim 1 whereby said spherical body is a bowling ball and said axis is chosen substantially perpendicular to the floor of the bowling alley.

* * * * *